(12) United States Patent
Choi et al.

(10) Patent No.: US 8,467,011 B2
(45) Date of Patent: Jun. 18, 2013

(54) DISPLAY DEVICE

(71) Applicant: LG Display Co., Ltd., Seoul (KR)

(72) Inventors: Hyun Ho Choi, Seoul (KR); Han Young Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/720,930

(22) Filed: Dec. 19, 2012

(65) Prior Publication Data

US 2013/0107162 A1    May 2, 2013

Related U.S. Application Data

(62) Division of application No. 12/666,982, filed as application No. PCT/KR2008/003877 on Jul. 1, 2008, now Pat. No. 8,350,982.

(30) Foreign Application Priority Data

| Jul. 6, 2007 | (KR) | 10-2007-0067994 |
| Jul. 12, 2007 | (KR) | 10-2007-0069895 |
| Jul. 20, 2007 | (KR) | 10-2007-0072680 |

(51) Int. Cl.
*G02F 1/1333* (2006.01)

(52) U.S. Cl.
USPC .......................................................... 349/58

(58) Field of Classification Search
USPC ........................................................... 349/58
See application file for complete search history.

(56) References Cited

U.S. PATENT DOCUMENTS

| 7,344,295 B2 | 3/2008 | Jeong |
| 2007/0216826 A1 | 9/2007 | Lee et al. |
| 2007/0273809 A1 | 11/2007 | Lee |
| 2010/0328570 A1* | 12/2010 | Kim et al. ....................... 349/58 |

FOREIGN PATENT DOCUMENTS

| JP | 2000-214457 A | 8/2000 |
| KR | 10-2005-0100930 A | 10/2005 |
| KR | 10-2006-0059476 A | 6/2006 |
| KR | 0719658 B1 | 5/2007 |
| KR | 10-2007-0066081 A | 6/2007 |
| KR | 0732998 B1 | 6/2007 |

* cited by examiner

*Primary Examiner* — Timothy L Rude
(74) *Attorney, Agent, or Firm* — Birch, Stewart, Kolasch & Birch, LLP

(57) ABSTRACT

A display device according to an embodiment includes a liquid crystal panel; a backlight assembly disposed below the liquid crystal panel; a chassis including: a first support section, which is disposed at sides of the liquid crystal panel and the backlight assembly, and a second support section, which is bent or curved from the first support section; and a frame disposed at an inner side of the chassis, wherein the frame has a first frame, a second frame, a third frame and a fourth frame and at least one of the first to the fourth frames has a height lower than a height of the first support section.

7 Claims, 9 Drawing Sheets

DISPLAY DEVICE

CROSS REFERENCE TO RELATED APPLICATIONS

This application is a Divisional of copending application Ser. No. 12/666,982 filed on Dec. 28, 2009, which is a National Phase of PCT International Application No. PCT/KR2008/003877 filed on Jul. 1, 2008, which claims the benefit of Korean Patent Application Nos. 10-2007-0067994 filed on Jul. 6, 2007, 10-2007-0069895 filed on Jul. 12, 2007, and 10-2007-0072680 filed on Jul. 20, 2007. The entire contents of all of the above applications are hereby incorporated by reference.

TECHNICAL FIELD

The embodiment relates to a display device.

BACKGROUND ART

An LCD (liquid crystal display device) displays an image using electrical and optical characteristics of liquid crystal. Since the LCD is a non-emissible device, the LCD requires a backlight assembly. A receiving device is required, which receives a liquid crystal panel or the backlight assembly and comprises a mold frame and a chassis.

The mold frame receives and fixes a backlight unit and an LCD panel. The chassis is coupled with the mold frame to reinforce the strength of the backlight unit, and has a structure corresponding to the external appearance of the mold frame.

Thus, the mold frame and the chassis are manufactured, respectively, and then are fitted with each other.

DISCLOSURE OF INVENTION

Technical Problem

The embodiment provides a display device having improved strength.

Technical Solution

The display device according to an embodiment comprises a liquid crystal panel; a backlight assembly disposed below the liquid crystal panel; a frame receiving at least a part of the liquid crystal panel and the backlight assembly; and a chassis disposed at the frame, wherein at least a part of the chassis is inserted into the frame.

The display device according to another embodiment comprises a liquid crystal panel; a first support section disposed below the liquid crystal panel; and a second support section connected with the first support section, and disposed at a side of the liquid crystal panel while exposing corners of the liquid crystal panel.

The display device according to further another embodiment comprises a liquid crystal panel; a backlight assembly disposed below the liquid crystal panel; a chassis comprising a first support section, which is disposed at sides of the liquid crystal panel and the backlight assembly, and a second support section is bent or curved from the first support section; and a frame disposed at an inner side of the chassis, wherein at least a part of the frame has a height lower than a height of the first support section.

Advantageous Effects

According to the embodiment, the structure of the display device is modified such that the display device has improved strength as well as a slim size.

BEST MODE FOR CARRYING OUT THE INVENTION

Hereinafter, an LCD and a manufacturing method thereof according to embodiments will be described with reference to the accompanying drawings.

Figure 1:
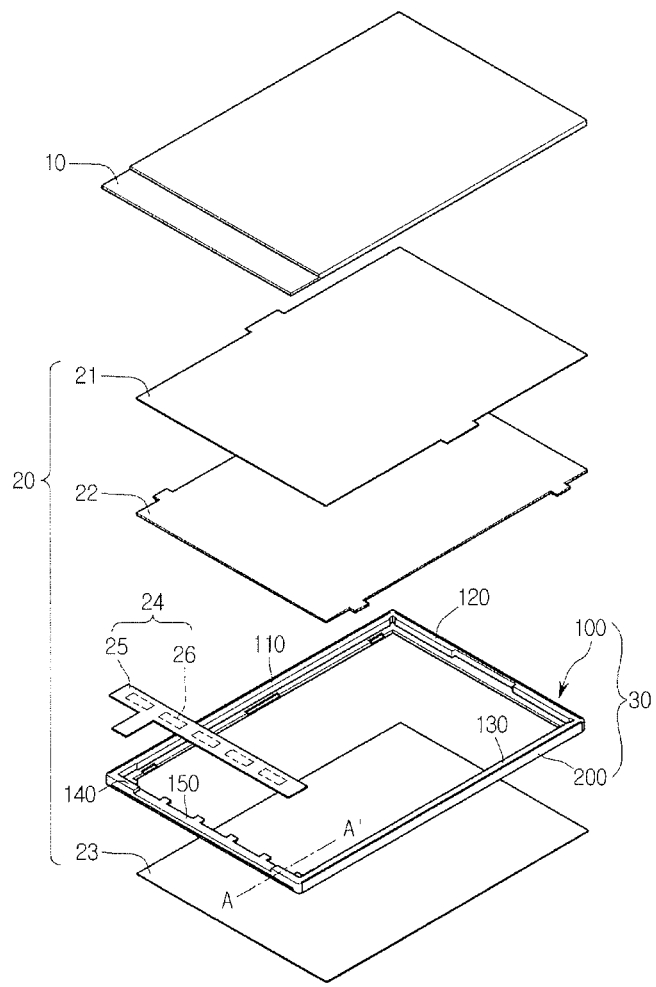
FIG. 1 is an exploded perspective view illustrating an LCD according to a first embodiment.

FIG. 1 is an exploded perspective view illustrating an LCD according to a first embodiment.

Referring to FIG. 1, the LCD comprises a liquid crystal panel 10, a backlight assembly 20 and a receiving device 30.

The liquid crystal panel 10 includes a TFT substrate, a color filter substrate and a liquid crystal layer interposed between the TFT substrate and the color filter substrate.

The backlight assembly 20 comprises a light emitting unit 24, a light guide plate 22, an optical sheet 21 and a reflective sheet 23.

The light emitting unit 24 comprises a FPCB (flexible printed circuit board) 25 and a lamp 26 such as an LED or a CCFL mounted on the FPCB 25. The lamp 26 comprising a plurality of LEDs is mounted on the rear surface of the FPCB 25 of the light emitting unit 24 while being electrically connected with a main substrate (not shown).

The light guide plate 22 receives light from the light emitting unit 24 to uniformly distribute the light over the whole light emitting area of a backlight.

The optical sheet 21 is attached to the light guide plate 22 and selectively comprises a lens sheet, a diffusion sheet, a protective sheet and the like.

The reflective sheet 23 is attached to the bottom surface of the light guide plate 22 to reflect light, which is leaked through the bottom surface of the light guide plate 22, to the light emitting area.

The liquid crystal panel 10 and the backlight assembly 20 must be received and fixed. To this end, the receiving device 30 is required.

Figure 2:
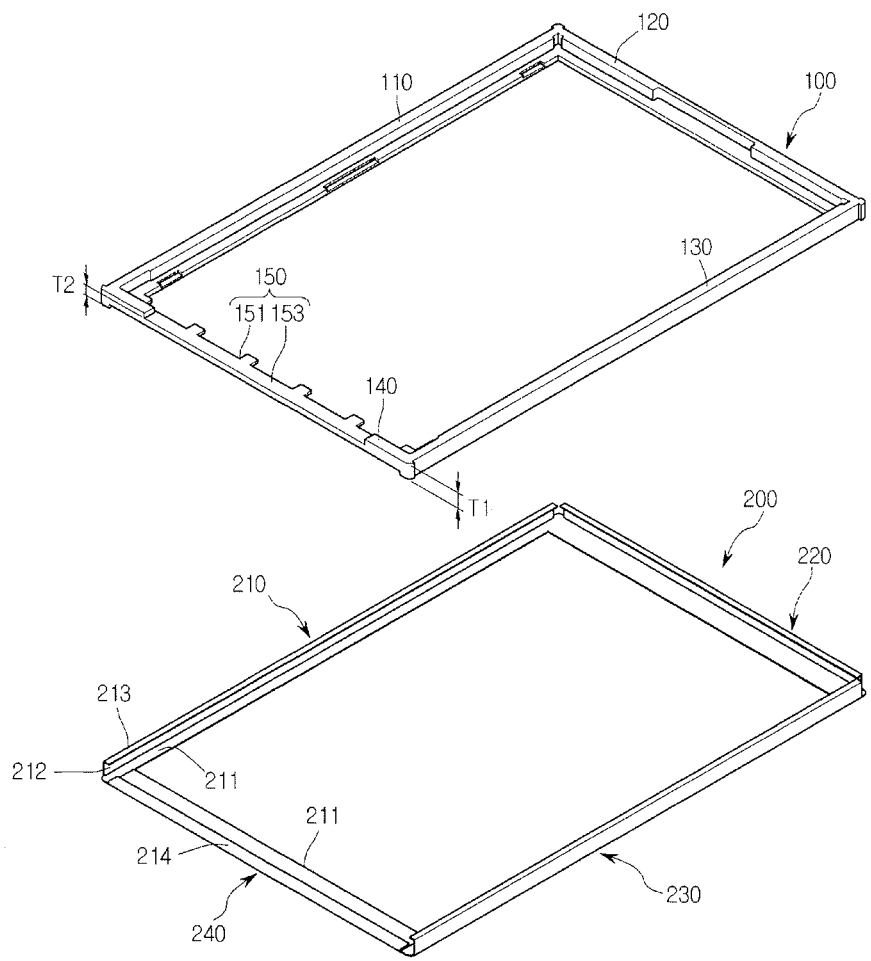
FIG. 2 is a perspective view illustrating a state in which a mold frame is separated from a chassis.
Figure 3:
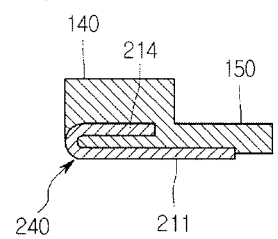
FIG. 3 is a sectional view taken along line A-A of FIG. 1.

FIG. 2 is a perspective view illustrating a state in which a mold frame is separated from a chassis and FIG. 3 is a sectional view taken along line A-A of FIG. 1.

Referring to FIG. 2, the receiving device 30 comprises the mold frame 100 and the chassis 200.

The mold frame 100 has a shape corresponding to the external appearance of the liquid crystal panel 10 and the backlight assembly 20 such that the liquid crystal panel 10 and the backlight assembly 20 can be received in the mold frame 100.

The mold frame 100, for example, comprises four frames. Hereinafter, the four frames will be referred to as a first frame 110, a second frame 120, a third frame 130 and a fourth frame 140.

The first frame 110 faces the third frame 130 and the second frame 120 faces the fourth frame 140. The first to fourth frames 110, 120, 130 and 140 are interconnected to form a closed loop. When viewed in a plan view, the first to fourth frames 110, 120, 130 and 140 form a rectangular frame.

For example, the mold frame 100 may comprise synthetic resin such as polycarbonate resin, styrene resin, polyvinyl chloride or polypropylene.

A lamp receiving section 150 can be formed at the inner side of the fourth frame 140 to receive the light emitting unit 24.

The lamp receiving section 150 comprises a lamp receiving groove 151, which receives the lamp 26, and a support 153 that receives the FPCB 25 on which the lamp 26 is mounted.

The lamp receiving section 150 has a thickness thinner than that of the fourth frame 140 such that the light emitting unit 24 can be received in the lamp receiving section 150.

The lamp receiving section 150 has a thickness T2 thinner than a thickness T1 of a end portion of the fourth frame 140, so that a step difference is formed between the end portion of the fourth frame 140 and the lamp receiving section 150.

As the light emitting unit 24 is received in the lamp receiving section 150, the lamp 26 of the light emitting unit 24 is inserted into the lamp receiving groove 151 and the FPCB 25 is installed at the support 153.

Thus, although the light emitting unit 24 is received in the lamp receiving section 150 having the thickness thinner than that of the end portion of the fourth frame 140, the entire thickness of the LCD is not affected by the step difference formed between the end portion of the fourth frame 140 and the lamp receiving section 150, so that the LCD can have a slim structure.

The chassis 200 is coupled with the outer end surface of the mold frame 100 to reinforce the strength of the mold frame 100.

The chassis 200 surrounds the first to fourth frames 110, 120, 130 and 140.

The chassis 200, for example, comprises four frames. Hereinafter, the four frames will be referred to as a fifth frame 210, a sixth frame 220, a seventh frame 230 and an eighth frame 240.

The chassis 200 may comprise metal material. For example, the chassis 200 may comprise at least one of stainless steel, iron, aluminum, an aluminum alloy and copper.

The fifth to seventh frames 210, 220 and 230 are coupled with the first to third frames 110, 120 and 130, respectively, and the eighth frame 240 is coupled with the fourth frame 140.

The fifth to seventh frames 210, 220 and 230 comprise a first support section 211, a second support section 212 and a third support section 213, respectively.

The first support section 211 is disposed below the mold frame 100. In more detail, the first support section 211 is coupled with the bottom surfaces of the first to third frames 110, 120 and 130. Further, the first support section 211 supports the mold frame 100.

The second support section 212 is extended in vertical direction with the first support section 211 from the first support section 211 upward. The second support section 212 is disposed at the outer side of the mold frame 100. In more detail, the second support section 212 is coupled with the outer sides of the first to third frames 110, 120 and 130.

The third support section 213 is extended in vertical direction with and from the second support section 212. The third support section 213 is disposed above the mold frame 100. In more detail, the third support section 213 is coupled with the upper surfaces of the first to third frames 110, 120 and 130.

That is, the fifth to seventh frames 210, 220 and 230 of the chassis 200 may have a substantially C-shaped section made of the first to third support sections 211 to 213, respectively.

Referring to FIGS. 2 and 3, the eighth frame 240 comprises the first support section 211 coupled with the bottom surface of the fourth frame 140, and a fourth support section 214 inserted into the fourth frame 140 of the mold frame 100.

Although not shown in FIGS. 2 and 3, the fifth to seventh frames 210, 220 and 230 of the chassis 200 may have the same structure as that of the eighth frame 240 of the chassis 200.

The fourth support section 214 is bent or curved by 180° from the end portion of the first support section 211 and is extended from the first support section 211 such that the first support section 211 is parallel to the fourth support section 214. That is, the first support section 211 and the fourth support section 214 of the eighth frame 240 form a folding structure such that the first support section 211 faces the fourth support section 214.

Thus, the first support section 211 of the eighth frame 240 of the chassis 200 is coupled with the bottom surface of the fourth frame 140 of the mold frame 100, and the fourth support section 214 is inserted into the fourth frame 140.

As the chassis 200 is coupled with the mold frame 100, the first to third frames 210, 220 and 230 of the chassis 200 surround the outer end surfaces of the first to third frames 110, 120 and 130 of the mold frame 100.

Further, the first support section 211 of the eighth frame 240 is coupled with the bottom surface of the fourth frame 140, and the fourth support section 214 is inserted into the fourth frame 140, so that the strength of the mold frame 100 can be enhanced without exerting an influence upon the thickness of the mold frame 100.

Thus, the fourth support section 214 is coupled with the fourth frame 140 in the state in which the fourth support section 214 is bent or curved by 180° from the first support section 211, the fourth support section 214 can also be coupled with the lamp support 153 having a thin thickness T2 of the fourth frame 140.

In an area of a chassis where the hamming is not conventionally available due to the restriction rule for a bending process, the embodiment enables the hamming, so that the efficiency of the chassis can be improved even if the chassis has a thin thickness. Further, when the chassis 200 is folded by bending the chassis at an angle of 180, a physical space actually exists, so that the mold frame 100 can be firmly coupled with the chassis 200 during an insert injection molding process.

Furthermore, when the chassis 200 is folded by bending the chassis 200 at an angle of 180, a coupling space with the mold frame 100 exists, so that the strength of the mold frame 100 can be enhanced.

Although no coupling space with the mold frame 100 exists because the first and fourth support sections 211 and 214 of the chassis 200 closely make contact with each other, the fourth support section 214 of the chassis 200 supports the mold frame 100, so that the strength of the mold frame 100 can be enhanced.

The chassis 200 is coupled with the first to third frames 110, 120 and 130 of the mold frame 100 in the form of a substantial C shape, so that the strength of the mold frame 100 can be reinforced.

Further, the chassis 200 is inserted into the fourth frame 140 having a thin thickness, so that the strength of the mold frame 100 can be considerably reinforced.

The mold frame 100 can be coupled with the chassis 200 through insert injection molding process.

Figure 4:
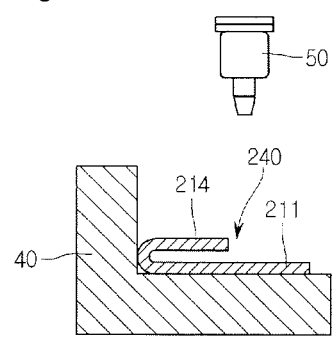
FIG. 4 is a sectional view illustrating a method in which a mold frame is coupled with a chassis.

FIG. 4 is a sectional view illustrating a method in which the mold frame is coupled with the chassis.

Referring to FIG. 4, according to the insert injection molding process, the chassis 200 comprising the fifth to eighth frames 210, 220, 230 and 240 is installed at a mold frame 40 of an injection molding apparatus (not shown). In particular, FIG. 4 is a sectional view of the mold frame 40 at which the eighth frame 240 of the chassis 200 is installed.

The reference number 50 indicates a material injector.

The first and fourth support sections 211 and 214 of the eighth frame 240 can be formed through a hamming process. For example, the first support section 211 can face the fourth support section 214 by bending, which extends from the end portion of the first support section 211 of the eighth frame 240, at an angle of 180.

Then, the injection molding process, in which synthetic resin (material of the mold frame 100) is injected into the frame 40 for molding and is heated and cured, is performed, so that the chassis 200 can be integrally formed with the mold frame 100.

Thus, the chassis 200 is coupled with the mold frame 100 through the injection molding process, so that the coupling strength therebetween can be enhanced.

At this time, when the first and fourth support sections 211 and 214 of the chassis 200 face each other, a physical space exists between the first and fourth support sections 211 and 214.

Further, mold material is also inserted between the first and fourth support sections 211 and 214 and the mold frame 100 is firmly fixed to the chassis 200, so that the coupling strength between the first and fourth support sections 211 and 214 can be increased.

Moreover, the first and fourth support sections 211 and 214 of the chassis 200 has a folding structure through the hamming process, so that the hamming process can be applied to the mold frame 100 requiring thin thickness. Thus, the LCD can have a slim structure.

Figure 5:
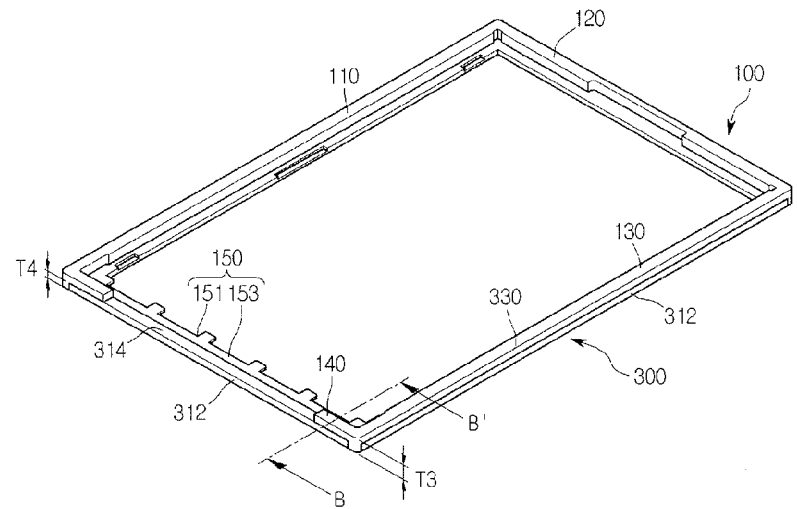
FIG. 5 is a perspective view illustrating a state in which a mold frame is coupled with a chassis according to a second embodiment.
Figure 6:
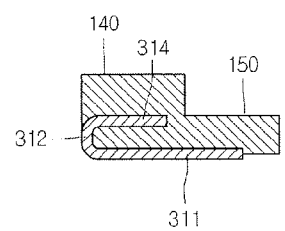
FIG. 6 is a sectional view taken along line B-B of FIG. 5.
Figure 7:
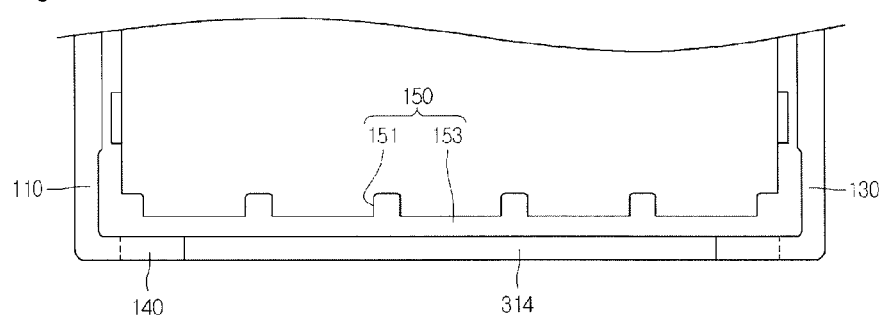
FIG. 7 is a plan view illustrating a chassis coupled with a lamp receiving section of a mold frame.

FIG. 5 is a perspective view illustrating a state in which a mold frame is coupled with a chassis according to a second embodiment, FIG. 6 is a sectional view taken along line B-B of FIG. 5, and FIG. 7 is a plan view illustrating the chassis coupled with a lamp receiving section of the mold frame.

Referring to FIGS. 5 and 6, the chassis 300 has a shape corresponding to the external appearance of the mold frame 100 shown in FIG. 2 to surround the first to fourth frames 110, 120, 130 and 140 of the mold frame 100.

The chassis 300, for example, comprises four frames formed in one united body.

The chassis 300 may comprise metal material. For example, the chassis 300 may comprise at least one of stainless steel, iron, aluminum, an aluminum alloy and copper.

The chassis 300 comprises a first support section 311, a second support section 312 and a fourth support section 314.

The first support section 311 is disposed below the mold frame 100 to support the mold frame 100. In more detail, the first support section 311 is coupled with the bottom surface of the mold frame 100.

The second support section 312 extends from the end portion of the first support section 311 and then is extended in vertical direction with the first support section 311 such that the second support section 312 is coupled with the outer side of the mold frame 100.

The fourth support section 314 extends from the end portion of the second support section 312 and then is extended in horizontal direction with the second support section 312 such that the fourth support section 314 is inserted into the mold frame 100.

That is, the first support section 311 is connected in parallel with the fourth support section 314 through the second support section 312 while facing the fourth support section 314.

The chassis 300 has a substantially C-shaped section made of the first support section 311, the second support section 312 and the fourth support section 314. In particular, the chassis 300 has a thickness T4 thinner than the thickness T3 of the mold frame 100, so that the chassis 300 can be inserted into the mold frame 100.

As the chassis 300 is coupled with the mold frame 100, the first support section 311 is coupled with the bottom surfaces of the first to fourth frames 110, 120, 130 and 140 of the mold frame 100.

Further, the second support section 312 is coupled with the outer sides of the first to fourth frames 110, 120, 130 and 140, and the fourth support section 314 is inserted into outer sides of the first to fourth frames 110, 120, 130 and 140.

Although not shown in FIGS. 5 and 6, the fifth to seventh frames 310, 320 and 330 of the chassis 300 have the same structure as that of the fifth to seventh frames 210, 220 and 230 of the chassis 200 of FIG. 2 to surround the first to third frames 110, 120 and 130 of the mold frame 100, respectively.

Referring to FIG. 7, the chassis 300 coupled with the fourth frame 140 of the mold frame 100 may be selectively exposed.

The lamp receiving section 150 is formed in the fourth frame 140, so that a step difference is formed between the fourth frame 140 and the lamp receiving section 150. Thus, the upper surface of the fourth support section 314 of the chassis 300 coupled with the lamp receiving section 150 can be exposed.

That is, the fourth support section 314 of the chassis 300 is extended from the end of the second support section 312 in horizontal direction on the height of the thickness of the lamp receiving section 150.

At this time, since the end portion of the fourth frame 140 of the mold frame 100 has a thickness thicker than that of the lamp receiving section 150, a portion of the chassis 300 is inserted into the fourth frame 140 in the end portion of the fourth frame 140 and the remaining portion of the chassis 300 is positioned at the upper portion of the lamp receiving section 150 while being exposed to the outside.

Further, the second support section 312 of the chassis 300 and the lamp receiving section 150 can have the same surface height.

Since the thickness T4 of the second support section 312 of the chassis 300 is equal to the thickness T3 of the lamp receiving section 150, the fourth support section 314 extending from the second support section 312 can be located on the same plane with the lamp receiving section 150.

Thus, if the light emitting unit 24 is located at the upper portion of the lamp receiving section 150 and the fourth support section 314, which have the flat structure, the FPCB 25 also maintains flatness without protruding.

This can be achieved using the insert injection molding process as mentioned above.

Further, since the chassis 300 has a structure designed to surround the first to fourth frames 110, 120, 130 and 140 of the mold frame 100, in particular, the lamp receiving section 150 having a thin thickness, the chassis 300 can uniformly support the whole area of the mold frame 100, so that the strength of the mold frame 100 can be improved.

Furthermore, the contact area between the substantial C-shaped chassis 300 and the mold frame 100 is increased, so that the strength of the mold frame 100 can be reinforced.

According to the related art, although the mold frame is coupled with the chassis in an area in which the FPCB and the LED FPCB of the LCD are installed, the strength of the mold frame is slightly improved due to the step difference between the mold frame and the chassis.

However, the embodiment uses the structure and the method in which the chassis is inserted into the mold frame to remove the step difference between the mold frame and the chassis, so that the strength of the chassis can be significantly improved. In detail, the embodiment uses the insert molding structure to improve the strength of the chassis. In addition, the chassis can be formed with the substantially C-shaped structure through hamming and the step difference can be removed between the mold frame and the chassis, so that the strength of the chassis can be significantly improved.

Further, many limitations exist when performing hamming to make the substantial C-shaped chassis. However, according to the embodiment, the bending height of the substantial C-shaped chassis can be properly lowered within the limitations, so that the mold frame can be fabricated with a predetermined shape.

In particular, the hamming conditions for the substantial C-shaped chassis are adjusted such that the hamming can be available in various places in the chassis. Thus, the strength of the chassis is significantly improved.

Moreover, the thickness of the mold frame is decreased using the hamming process for the substantial C-shaped chassis, so that the receiving device can have a slim structure.

Hereinafter, a receiving device according to a third embodiment will be described with reference to FIGS. 8 to 10.

Figure 8:
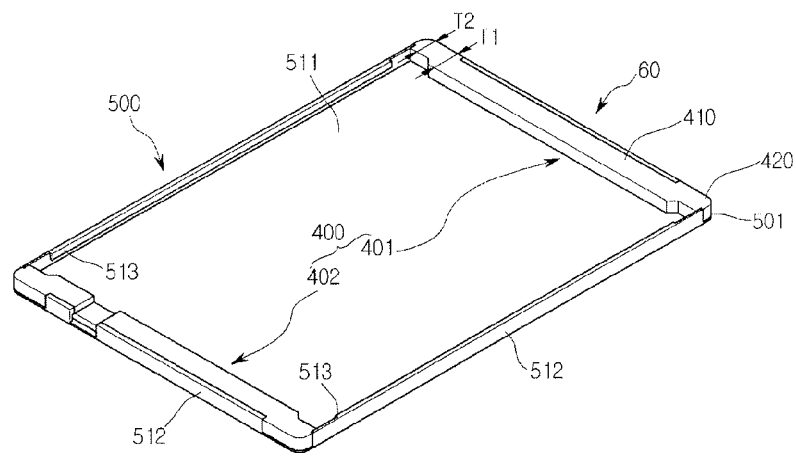
FIG. 8 is a perspective view illustrating a receiving device according to a third embodiment.
Figure 9:
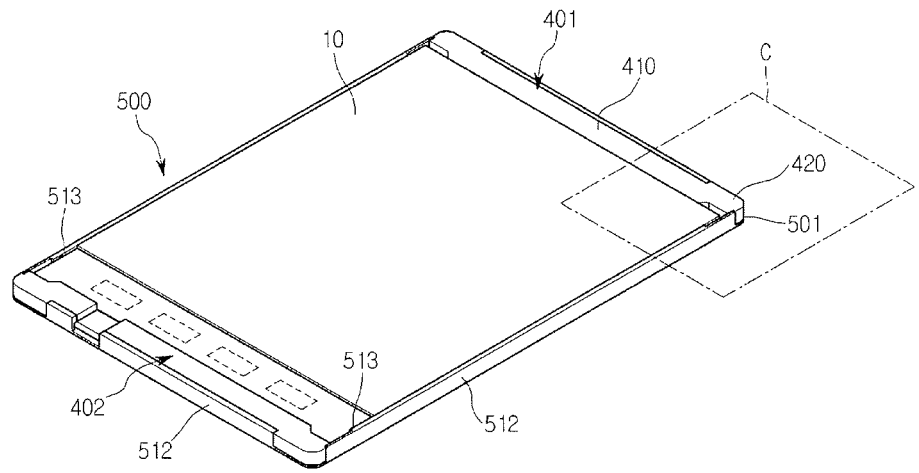
FIG. 9 is a perspective view illustrating a state in which a liquid crystal panel is coupled with the receiving device of FIG. 8.
Figure 10:
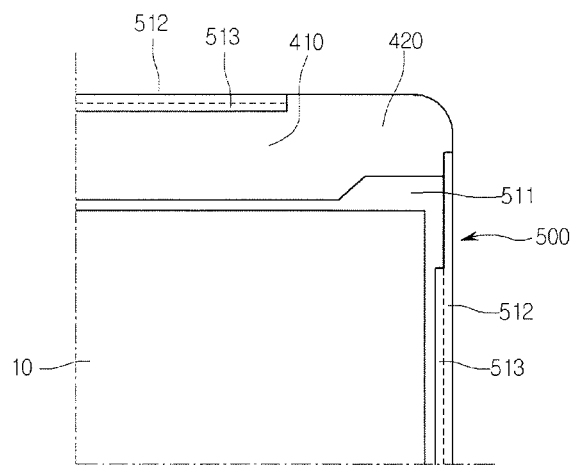
FIG. 10 is an enlarged plan view illustrating the area C of FIG. 9.

FIG. 8 is a perspective view illustrating the receiving device according to the third embodiment, FIG. 9 is a perspective view illustrating a state in which a liquid crystal panel is coupled with the receiving device of FIG. 8, and FIG. 10 is an enlarged plan view illustrating the area C of FIG. 9.

Referring to FIGS. 8 to 10, the LCD comprises a liquid crystal panel 10, and a receiving device 60.

The liquid crystal panel 10 includes upper and lower transparent substrates, and a liquid crystal layer interposed between the upper and lower transparent substrates. At least one liquid crystal panel 10 is prepared according to the number of displayed screens.

The receiving device 60 receives the liquid crystal panel 10. Further, a backlight assembly that irradiates light toward the liquid crystal panel 10 is disposed below the liquid crystal panel 10. The receiving device 60 can receive the liquid crystal panel 10 and the backlight assembly.

The receiving device 60 comprises a mold frame 400 and a chassis 500.

The mold frame 400 has a shape corresponding to the external appearance of the liquid crystal panel 10 to receive the liquid crystal panel 10.

The mold frame 400 comprises a first mold frame 401 and a second mold frame 402 to protect the side of the liquid crystal panel 10. For example, the mold frame 400 may comprise synthetic resin such as polycarbonate resin, styrene resin, polyvinyl chloride or polypropylene.

The first and second mold frames 401 and 402 are disposed at opposite sides of the liquid crystal panel 10 to protect the liquid crystal panel 10.

In particular, the first and second mold frames 401 and 402 can be disposed at opposite sides of the liquid crystal panel 10. Thus, the mold frame 400 is not disposed at the other sides of the liquid crystal panel 10, so that the LCD can have a slim structure.

Although not shown in FIGS. 8 to 10, a lamp receiving section having a low step difference can be formed at the inner side of the second mold frame 402 such that the lamp receiving section receives a light emitting unit of the backlight unit.

The first and second mold frames 401 and 402 comprise a body section 410 and a receiving section 420, respectively.

The body section 410 is disposed at the side of the liquid crystal panel 10 while having a first width T1. The body section 410 makes contact with the side of the liquid crystal panel 10.

The receiving section 420 extends from both ends of the body section 410 while having a second width T2. For example, the receiving section 420 and the body section 410 can be connected with each other while forming a step difference therebetween. The receiving section 420 is formed with the body section 410 in one united body.

Further, the receiving section 420 is formed such that the corners of the liquid crystal panel 10 are located at the edges of the first and second mold frames 401 and 402.

The second width T2 is smaller than the first width T1. Thus, the first and second mold frames 401 and 402 can ensure a coupling space when they are coupled with the liquid crystal panel 10.

In detail, the receiving section 420 can be spaced apart from the liquid crystal panel 10 by the difference between the first width T1 and the second width T2.

Accordingly, when the liquid crystal panel 10 is coupled with the mold frame 400, the corners of the liquid crystal panel 10 are located at the receiving section 420 of the mold frame 400, so that the corners of the liquid crystal panel 10 can be prevented from being damaged.

In particular, when manufacturing the liquid crystal panel 10, since burr phenomenon occurs, in which the corners of the liquid crystal panel 10 are not smoothly formed, the liquid crystal panel 10 may be broken when the liquid crystal panel 10 is coupled with the receiving device 60. According to the embodiment, the receiving section 420 is formed at the mold frame 400, so that the liquid crystal panel 10 can be prevented from being broken when the liquid crystal panel 10, in which the burr phenomenon has occurred, is coupled with the mold frame 400.

The chassis 500 is prepared for improving the strength of the mold frame 400 and is coupled with the outer end surface of the mold frame 400.

The chassis 500 may comprise metal material. For example, the chassis 500 may comprise at least one of stainless steel, iron, aluminum, an aluminum alloy and copper.

The chassis 500 comprises a first support section 511 and second support sections 512.

The first support section 511 is disposed below the liquid crystal panel 10 and the mold frame 400. Further, the first support section 511 is prepared for supporting the bottom surface of the mold frame 400 coupled with the liquid crystal panel 10, and has an area corresponding to the lower areas of the liquid crystal panel 10 and the mold frame 400.

The second support sections 512 extend from the first support section 511 upward such that the second support sections 512 are disposed at the sides of the liquid crystal panel 10 and the mold frame 400.

The second support sections 512 are prepared for supporting the sides of the liquid crystal panel 10 and the mold frame 400. For example, the number of the second support sections 512 is four and the second support sections 512 form a rectangular frame.

At this time, the second support sections 512 are disposed at the sides of the liquid crystal panel 10 except for areas corresponding to the corners of the liquid crystal panel 10. Two of the second support sections 512 are disposed at left and right sides of the liquid crystal panel 10 while facing each other.

Further, the other two of the second support sections 512 are disposed at the outer sides of the first and second mold frames 401 and 402 while facing each other.

A third support section 513 is formed at the chassis 500 to improve the strength of the chassis 500.

The third support section 513 extends from the edge of the second support section 512 inward at an angle of more than 150°. According to the embodiment, the third support section 513 extends from the second support section 512 inward at an angle of 180° so that the third support section 513 is parallel to the second support section 512.

In detail, the third support section 513 is subject to hamming such that the third support section 513 is folded while facing the second support section 512. Thus, the second and third support sections 512 and 513 form a double frame structure, so that the strength of the chassis 500 can be improved more than twice.

Further, the third support sections 513 are disposed at the sides of the liquid crystal panel 10 or the mold frame 400.

The third support section 513 may be formed on the entire surface of the second support section 512 or may be formed on a part of the second support section 512.

In particular, the third support sections 513 are selectively formed, so that the strength of the chassis 500 can be improved and the assembly space for the liquid crystal panel 10 can be ensured.

In detail, the third support sections 513 can be formed only remaining portions except for the edges at which the corners of the liquid crystal panel 10 are located.

For example, the third support sections 513 expose the corners of the liquid crystal panel 10.

The second and third support sections 512 and 513 can be classified into a portion that is subject to the hamming, and a portion that is not subject to the hamming.

Thus, the center portion of the second support section 512 is provided with the third support section 513 that is subject to the hamming, so that the strength of the chassis 500 can be improved more than twice.

In addition, since the edge of the second support section 512 has not been subject to the hamming process, the edge has a thickness less than a half of that of the center portion.

Thus, the edges of the second support section 512, at which the corners of the liquid crystal panel 10 are disposed, ensure a wider space than the center portion, so that the corners of the liquid crystal panel 10 can be prevented from being broken when the chassis 500 is coupled with the liquid crystal panel 10.

The corners of the chassis 500 are provided with opening sections 501 formed by removing a part of the chassis 500, so that the chassis 500 can be coupled with the mold frame 400.

As the mold frame 400 is coupled with the chassis 500, the edges of the first and second mold frames 401 and 402, which correspond to the corners of the mold frame 400, are inserted into the opening sections 501 of the chassis 500. Thus, the first and second mold frames 401 and 402 are received in the chassis 500.

Further, when viewed in a plan view, the frames of the mold frame 400 and the chassis 500 form a closed loop. At this time, the mold frame 400 and the second support section 512 can have the same height.

As the liquid crystal panel 10 is coupled with the receiving device formed by coupling the mold frame 400 with the chassis 500, the liquid crystal panel 10 is located between the first and second mold frames 401 and 402. Other sides of the liquid crystal panel 10 face the inner sides of the second support sections 512 of the chassis 500.

In particular, the receiving section 420 is formed at the edges of the first and second mold frames 401 and 402, at which the corners of the liquid crystal panel 10 are located, and the edge of the chassis 500 has a thickness thicker than any other parts to ensure a wider space in the receiving section 420.

Thus, when the liquid crystal panel 10 is coupled with the chassis 500, the corners of the liquid crystal panel 10 are coupled with the wide corners of the receiving section 420, so that the corners of the liquid crystal panel 10 can be prevented from being broken.

Further, the mold frame 400 and the chassis 500 are disposed at opposite sides of the liquid crystal panel 10, and only the chassis 500 is disposed at other sides of the liquid crystal panel 10, so that the LCD can have a slim structure while having improved strength.

Furthermore, in the chassis 500, the third support section 513 extends from the second support section 512. Thus, the chassis 500 has a dual structure and supports the sides of the mold frame 400 and the liquid crystal panel 10, so that the strength of the LCD can be reinforced.

Moreover, the backlight assembly provided with the light emitting unit is coupled with the bottom surface of the liquid crystal panel 10, so that the mold frame 400 and the chassis 500 form a closed loop. Thus, light irradiated from the light emitting unit can be prevented from being leaked.

Hereinafter, a receiving device according to a fourth embodiment will be described with reference to FIGS. 11 and 12.

Figure 11:
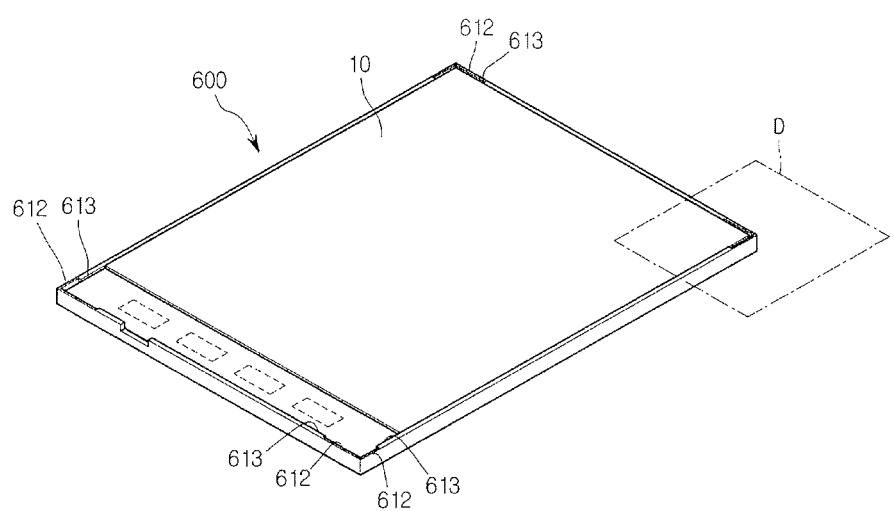
FIG. 11 is a perspective view illustrating a state in which a liquid crystal panel is coupled with a receiving device according to a fourth embodiment.
Figure 12:
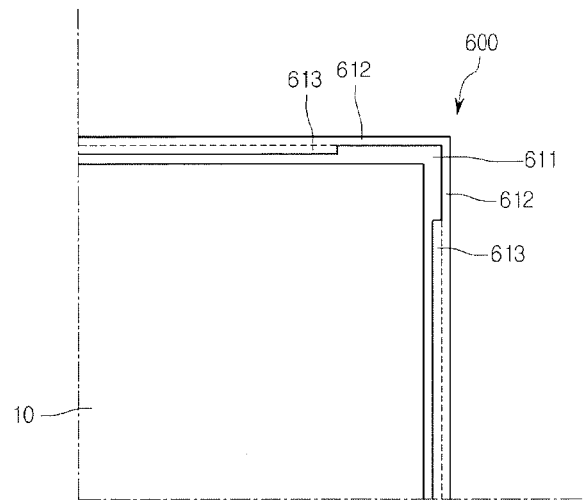
FIG. 12 is an enlarged plan view illustrating the area D of FIG. 11.

FIG. 11 is a perspective view illustrating a state in which a liquid crystal panel is coupled with the receiving device according to the fourth embodiment, and FIG. 12 is an enlarged plan view illustrating the area D of FIG. 11.

Referring to FIGS. 11 and 12, the receiving device comprises only a chassis 600. The chassis 600 may comprise metal material. For example, the chassis 600 may comprise at least one of stainless steel, iron, aluminum, an aluminum alloy and copper.

The chassis 600 comprises a first support section 611, second support sections 612 and third support sections 613.

The first support section 611 is disposed below the liquid crystal panel 10 to support the liquid crystal panel 10. The first support section 611 has an area corresponding to the lower area of the liquid crystal panel 10.

The second support sections 612 extend from the first support section 611 in different direction with the first support section such that the second support sections 612 are disposed at the sides of the liquid crystal panel 10. When viewed in a plan view, the second support sections 512 form a rectangular frame.

The third support section 613 extends from the edge of the second support section 612 inward at an angle of more than 150°. According to the embodiment, the third support section 613 extends from the second support section 612 inward at an angle of 180° so that the third support section 613 is parallel to the second support section 512.

In detail, the third support section 613 and the second support section 612 are subject to hamming to be folded such that the third support section 613 faces the second support section 612. Thus, the second and third support sections 612 and 613 form a double frame structure, so that the strength of the chassis 600 can be improved more than twice.

The first to third support sections 611 to 613 are formed in one united body.

The third support sections 613 are selectively formed in areas except for the corners of the chassis 600, so that the strength of the chassis 600 can be improved and the assembly space for the liquid crystal panel 10 can be ensured.

In detail, the third support sections 613 can be formed only in remaining areas except for the corners of the second support sections 612.

In other words, the third support sections 613 expose the corners of the liquid crystal panel 10. Further, the third support sections 613 are connected to the first support section 611 through the second support sections 612.

Thus, the third support sections 613 are bent or curved from the edges of the second support sections 612 through the hamming process except for the corners of the second support sections 612, so that the strength of the chassis 600 can be improved more than twice.

Further, the second support sections 612 are formed in the corners of the chassis 600, but the third support sections 613 not formed.

Thus, the corners of the chassis 600, at which the corners of the liquid crystal panel 10 are disposed, ensure a wider space than the center portion of the chassis 600, so that contact between the corners of the liquid crystal panel 10 and the chassis 600 is minimized when the chassis 600 is coupled with the liquid crystal panel 10. Consequently, the liquid crystal panel 10 can be prevented from being broken.

Further, the second support sections 612 are formed in one united body while forming a closed loop, so that the strength of the chassis 600 can be enhanced.

Hereinafter, a receiving device according to a fifth embodiment will be described with reference to FIGS. 13 and 14.

Figure 13:
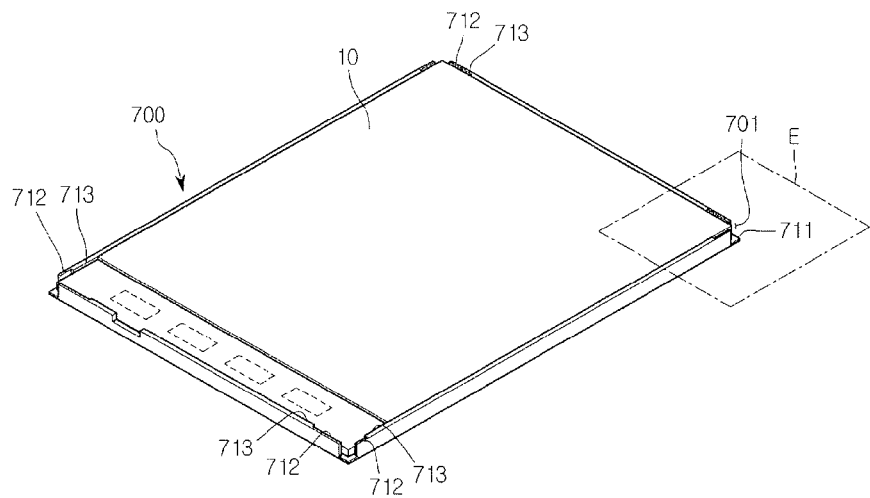
FIG. 13 is a perspective view illustrating a state in which a liquid crystal panel is coupled with a chassis according to a fifth embodiment.
Figure 14:
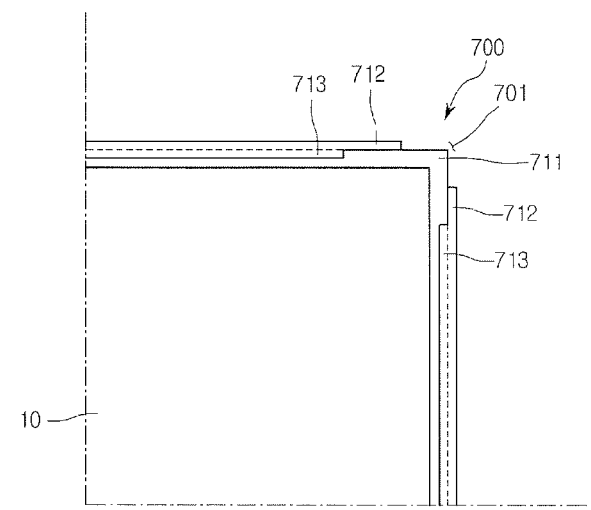
FIG. 14 is an enlarged plan view illustrating the area E of FIG. 13.

FIG. 13 is a perspective view illustrating a state in which a liquid crystal panel is coupled with a chassis having opening sections at the corners thereof, and FIG. 14 is an enlarged plan view illustrating the area E of FIG. 13.

The opening sections 701 can be formed in the chassis 700 by removing the corners of the chassis 700.

Since contact areas among the first to fourth frames 210, 220, 230 and 240 of the chassis 700 are removed, the opening sections 701 expose a first support section 711 corresponding to the corners of the chassis 700.

When the liquid crystal panel 10 is coupled with the chassis 700, the sides of the liquid crystal panel 10 are located at the inner sides of third support sections 713.

In particular, since the opening sections 701, from which the second and third support sections 712 and 713 are removed, are formed at the corners of the chassis 700 in which the corners of the liquid crystal panel 10 are located, the corners of the liquid crystal panel 10 do not make contact with the second and third support sections 712 and 713 of the chassis 700 when the liquid crystal panel 10 is coupled with the chassis 700. Thus, the corners of the liquid crystal panel 10 can be prevented from being broken.

Further, the liquid crystal panel 10 is directly coupled with the chassis 700 comprising metal, so that the LCD can have a slim structure.

Furthermore, the third support section 713 selectively subject to hamming is formed at the second support section 712 of the chassis 700, so that the second and third support sections 712 and 713 of the chassis 700 support the liquid crystal panel 10 while forming a dual structure. Thus, the strength of the receiving device can be improved more than twice.

Figure 15:
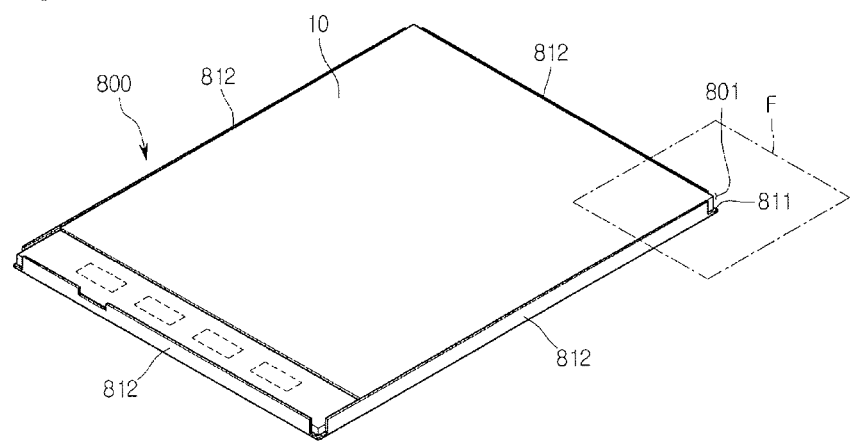
FIG. 15 is a perspective view illustrating a state in which a liquid crystal panel is coupled with a chassis according to a sixth embodiment.
Figure 16:
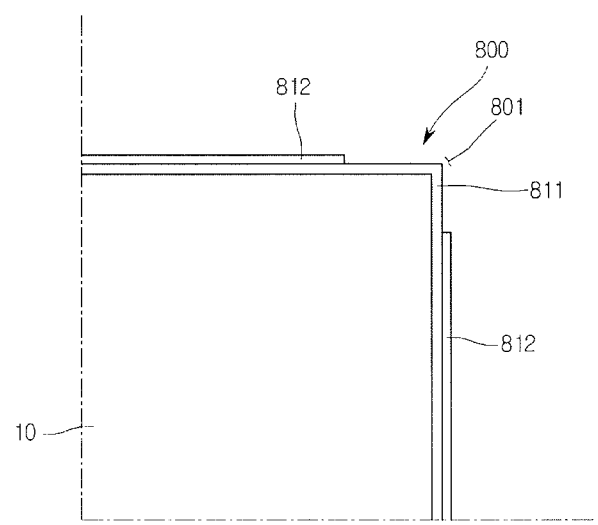
FIG. 16 is an enlarged plan view illustrating the area F of FIG. 15.

FIG. 15 is a perspective view illustrating a state in which a liquid crystal panel is coupled with a chassis according to a sixth embodiment, and FIG. 16 is an enlarged plan view illustrating the area F of FIG. 15.

Referring to FIGS. 15 and 16, the chassis 800 comprises a first support section 811 and second support sections 812.

The first support section 811 is disposed below the liquid crystal panel 10 and the second support sections 812 are disposed at the sides of the liquid crystal panel 10.

The chassis 800 comprises only the first support section 811 and the second support sections 812. In detail, the chassis 800 according to the embodiment does not comprise the third support sections as described in the embodiments.

Thus, the chassis 800 according to the embodiment supports the sides of the liquid crystal panel 10 using only the second support sections 812, so that the LCD according to the embodiment can have a slim structure.

The opening sections 801 can be formed in the chassis 800 by removing the corners of the chassis 800.

Since the corners of the chassis 800 are removed, the opening sections 801 expose a first support section 811 corresponding to the corners of the chassis 800.

As the liquid crystal panel 10 is coupled with the chassis 800, the second support sections 812 are located at the sides of the liquid crystal panel 10.

In particular, the opening sections 801 are formed at the corners of the chassis 800 in which the corners of the liquid crystal panel 10 are located, so that the corners of the liquid crystal panel 10 can be prevented from being broken when the liquid crystal panel 10 is coupled with the chassis 800.

Further, the liquid crystal panel 10 is directly coupled with the chassis 800 comprising metal, so that the LCD can have a slim structure. In particular, the chassis 800 supports the sides of the liquid crystal panel 10 using only the second support sections 812, so that the LCD according to the embodiment can have a slim structure.

Figure 17:
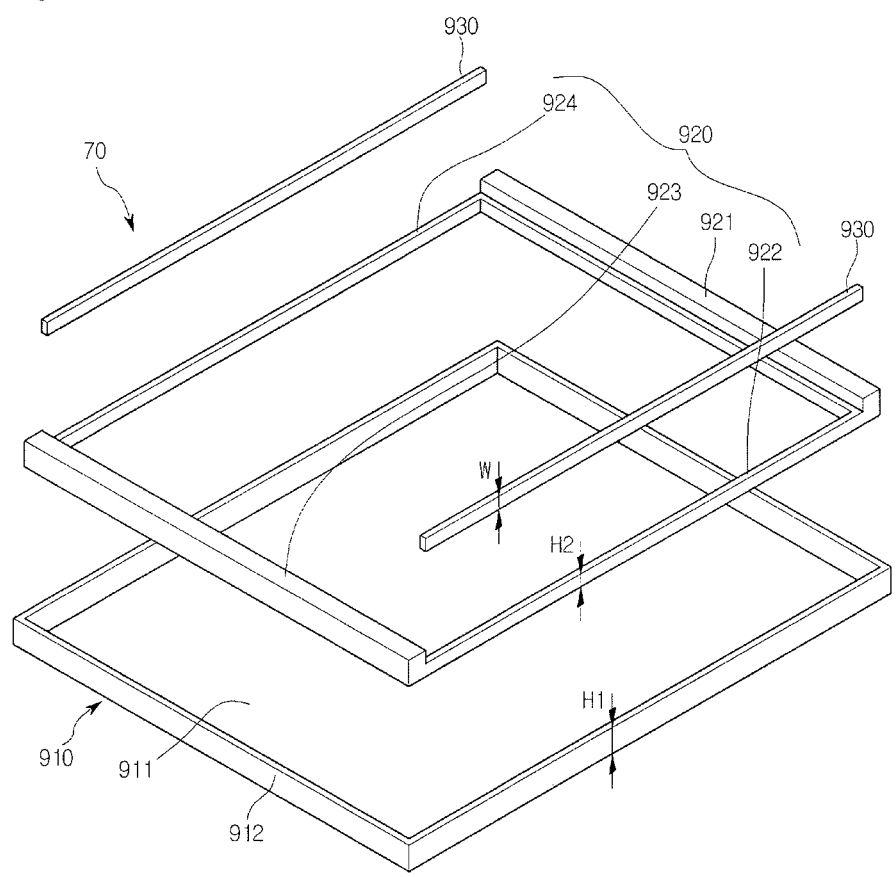
FIG. 17 is an exploded perspective view illustrating a receiving device according to a seventh embodiment.
Figure 18:
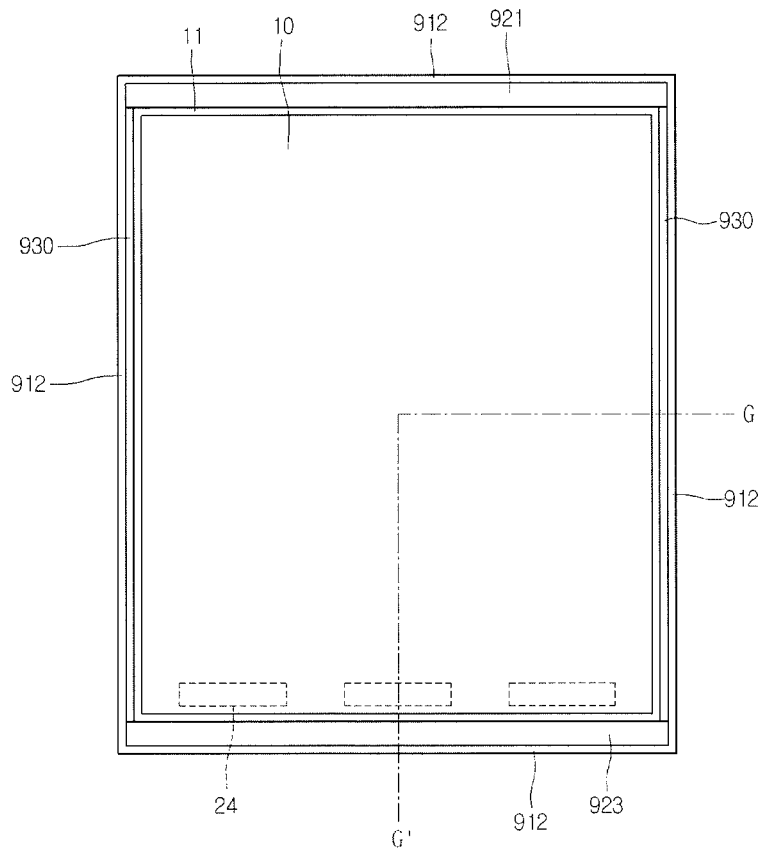
FIG. 18 is a plan view illustrating an LCD according to a seventh embodiment.
Figure 19:
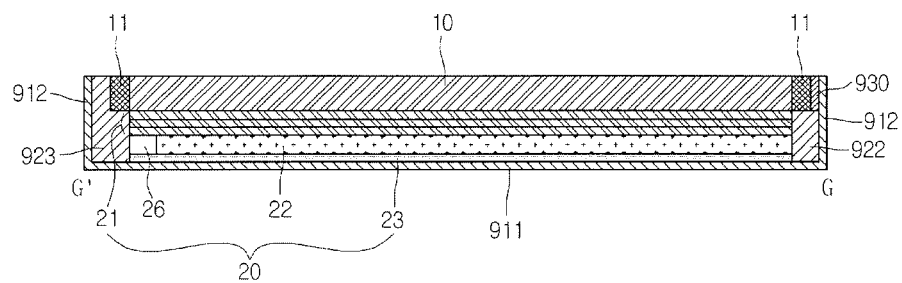
FIG. 19 is a sectional view taken along line G-G of FIG. 18.

FIG. 17 is an exploded perspective view illustrating a receiving device according to a seventh embodiment, FIG. 18 is a plan view illustrating an LCD according to the seventh embodiment, and FIG. 19 is a sectional view taken along line G-G' of FIG. 18.

Referring to FIGS. 17 to 19, the LCD comprises the receiving device 70, the backlight assembly 20 and the liquid crystal panel 10.

The receiving device 70 receives the backlight assembly 20 and the liquid crystal panel 10. The receiving device 70 comprises a chassis 910, a mold frame 920 and impact absorbing members 930.

The chassis 910 surrounds the mold frame 920. In detail, the mold frame 920 is disposed at the inner side of the chassis 910. The chassis 910 and the mold frame 920 can be coupled with each other.

The chassis 910 comprises a first support section 911 and second support sections 912.

The first support section 911 is disposed below the liquid crystal panel 10. In more detail, the first support section 911 is disposed below the mold frame 920 to support the mold frame 920. Further, the first support section 911 is disposed below the backlight assembly 20 to support the backlight assembly 20.

The second support sections 912 extends vertically from the first support section 911. The second support sections 912 are disposed at the sides of the liquid crystal panel 10 and/or the backlight assembly 20. Further, the second support sections 912 are disposed at the outer sides of the mold frame 920.

When viewed in a plan view, the second support sections 912 form a closed loop. Further, the second support sections 912 support the sides of the mold frame 920. Furthermore, the second support section 912 has a height of about 0.9 mm to 1.5 mm.

The chassis 910 may comprise metal. For example, the chassis 910 may comprise stainless steel, iron, aluminum, an aluminum alloy, copper, zinc and the like.

The mold frame 920 is disposed at the inner side of the chassis 910 and is disposed on the first support section 911. The mold frame 920, for example, comprises four frames to form a rectangular frame. In detail, the mold frame 920 comprises first to fourth frames 921 to 924 formed in one united body.

The first frame 921 faces the third frame 923 and the second frame 922 faces the fourth frame 924. The mold frame 920 forms a closed loop.

For example, the mold frame 920 may use polystyrene resin, polyethylene resin, polyurethane resin and the like.

The second and fourth frames 922 and 924 have a height H2 lower than the height H1 of the second support section 912, respectively. The second and fourth frames 922 and 924 may have the height H2 of about 0.4 mm to 0.8 mm. In detail, the second and fourth frames 922 and 924 expose a part of the inner sides of the second support sections 912.

The first and third frames 921 and 923 may have a height corresponding to the height H1 of the second support section 912, respectively. At this time, the first and third frames 921 and 923 have a structure in which a high portion and a lower portion are coupled with each other while forming a step difference therebetween.

The impact absorbing members 930 protect display panels disposed at the inner side of the mold frame 920 from physical impact. The impact absorbing members 930 absorb external physical impact or vibration. The impact absorbing members 930 are disposed at the inner side of the second support sections 912 while making contact with the second support sections 912. Further, the impact absorbing members 930 are disposed on the second and fourth frames 922 and 924.

The impact absorbing members 930 are disposed between the liquid crystal panel 10 and the second support section 912, respectively.

The impact absorbing member 930 and the second frame 922 may have height W and H2 respectively, wherein the total height of the height W and H2 corresponds to the height H1 of second support section 912.

Further, the impact absorbing member 930 can be disposed between the first frame 921 and the liquid crystal panel 10, and between the third frame 923 and the liquid crystal panel 10.

The impact absorbing member 930 may use acryl resin, polyurethane resin, rubber resin, tape and the like. The impact absorbing member 930 may comprise black pigment, black dye or black pixel.

The backlight assembly 20 is disposed at the inner side of the receiving device 70. The backlight assembly 20 generates light to output the light upward. The backlight assembly 20 comprises the reflective sheet 23, the lamp and the light guide plate 22 and the optical sheets 21.

The reflective sheet 23 is disposed on the first support section 911 at the inner side of the mold frame 920. The reflective sheet 23 reflects light, which is generated from the lamp 26, in the upward direction.

The light guide plate 22 is disposed on the reflective sheet 23. The light guide plate 22 is disposed at the inner side of the mold frame 920. The light guide plate 22 diffuses the light, which is generated from the lamp 26, in the upward direction.

The lamp 26 is disposed at the inner side of the mold frame 920 while being disposed on the reflective sheet 23. Further, the lamp 26 is disposed at the side of the light guide plate 22. The lamp 26 generates the light.

The optical sheets 21 are disposed on the light guide plate 22 while being disposed at the inner side of the mold frame 920. The optical sheets 21 improve the properties of the light generated from the lamp 26.

The liquid crystal panel 10 is disposed on the optical sheets 21. The liquid crystal panel 10 is disposed on the second and fourth frames 922 and 924 while being disposed at the inner side of the chassis 910. The liquid crystal panel 10 comprises a TFT substrate having a plurality of thin film transistors, a color filter substrate having color filters, and a liquid crystal layer interposed between the TFT substrate and the color filter substrate.

Light blocking members 11 can be disposed at the sides of the liquid crystal panel 10. The light blocking members 11 can be located adjacent to the liquid crystal panel 10. Further, the light blocking members 11 can be located adjacent to the impact absorbing member 930, respectively. The light blocking members 11 are disposed on the mold frame 920 while being disposed at the inner side of the second support section 912. The light blocking members 11 block light leaked through the sides of the liquid crystal panel 10.

For example, the light blocking members 11 may comprise acryl resin containing black pigment, black dye or black material.

The liquid crystal panel 10 is disposed on the stepped portion between the first and third frames 921 and 923 of the mold frame 920, and the second and fourth frames 922 and 924. According to the seventh embodiment, the ratio of the surface area of the liquid crystal panel 10 with respect to the surface area of the LCD can be increased.

As compared to the case in which the liquid crystal panel 10 is disposed at the inner side of the mold frame, the surface area of a portion, except for the liquid crystal panel 10, is decreased when viewed in a plan view. In detail, in the LCD according to the seventh embodiment, an area of a portion, in which an image is not displayed, is decreased when viewed in a plan view.

Further, when the chassis 910 comprises metal, physical impact may be applied to the liquid crystal panel 10. At this time, the impact absorbing members 930 protect the liquid crystal panel 10 from physical impact and vibration transferred through the chassis 910.

Figure 20:
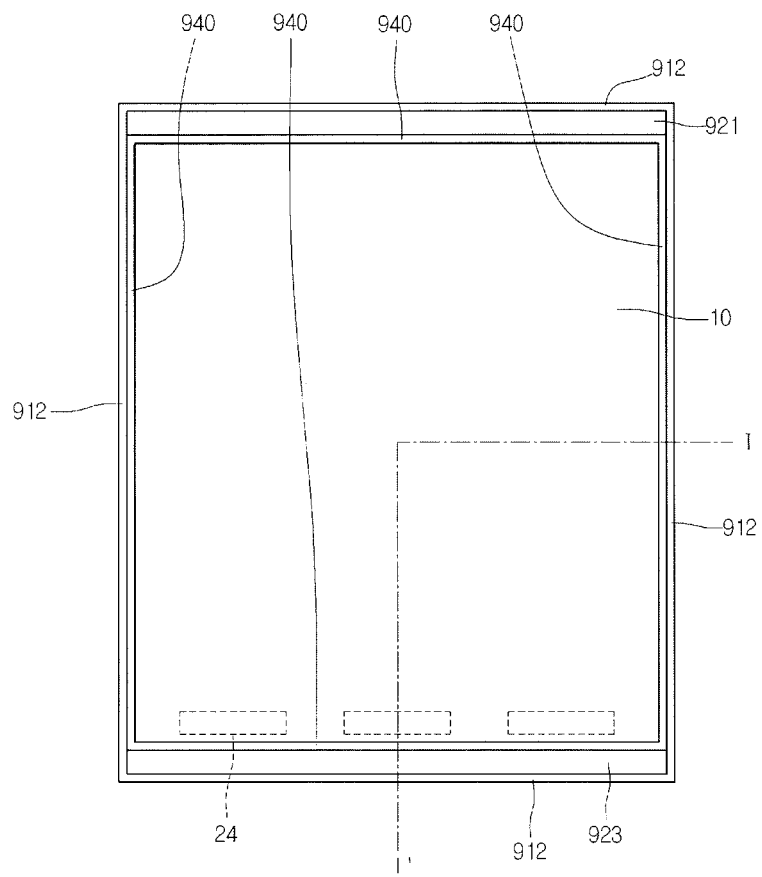
FIG. 20 is a plan view illustrating an LCD according to an eighth embodiment.
Figure 21:
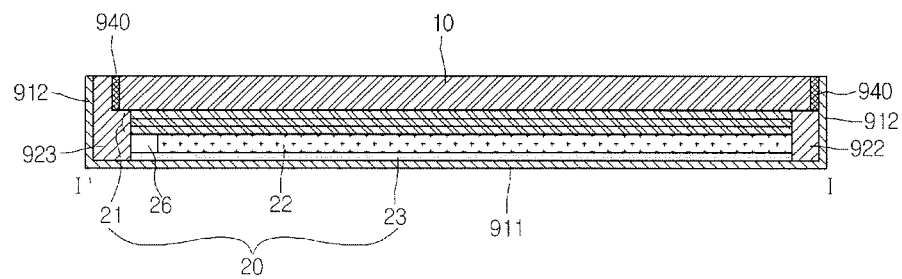
FIG. 21 is a sectional view taken along line I-I of FIG. 20.

FIG. 20 is a plan view illustrating an LCD according to an eighth embodiment and FIG. 21 is a sectional view taken along line I-I' of FIG. 20. A description about the eighth embodiment will be given with reference to the seventh embodiment, and a light blocking and impact absorbing member will be additionally described.

The LCD comprises the light blocking and impact absorbing member 940.

The light blocking and impact absorbing member 940 makes contact with the second support section 912. The light blocking and impact absorbing member 940 blocks light leaked through the side of the liquid crystal panel 10 and protects the liquid crystal panel 10 from external physical impact.

In detail, the light blocking and impact absorbing member 940 performs all functions of a light blocking member and an impact absorbing member. The light blocking and impact absorbing member 940 absorbs external physical impact and vibration. The light blocking and impact absorbing member 940 makes contact with the side of the liquid crystal panel 10.

The light blocking and impact absorbing member 940, for example, comprises at least one of black pigment, black dye and black material. The light blocking and impact absorbing member 940 may comprise polyurethane resin, polyrubber resin and the like.

The light blocking and impact absorbing member 940 comprises four members integrally formed with each other to form a closed loop. Further, the light blocking and impact absorbing member 940 is disposed at the side of the liquid crystal panel 10 while making contact with the side of the liquid crystal panel 10. In more detail, the light blocking and impact absorbing member 940 surrounds the side of the liquid crystal panel 10.

The light blocking and impact absorbing member 940 makes contact with the first and third frames 921 and 923, and is disposed on the second and fourth frames 922 and 924 while making contact with the second support section 912.

The LCD provided with the light blocking and impact absorbing member 940 does not require a light blocking member and an impact absorbing member as individual parts. This is because the light blocking and impact absorbing member 940 performs all functions of the light blocking member and the impact absorbing member. Thus, the surface area of a portion, in which an image is not displayed, can be decreased.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The display devices according to the embodiments are applied to a display module.

What is claimed is:

1. A display device comprising:
a liquid crystal panel;
a backlight assembly disposed below the liquid crystal panel;
a chassis including:
a first support section, which is disposed at sides of the liquid crystal panel and the backlight assembly, and
a second support section, which is bent or curved from the first support section; and
a frame disposed at an inner side of the chassis,
wherein the frame has a first frame, a second frame, a third frame and a fourth frame and at least one of the first to the fourth frames has a height lower than a height of the first support section.

2. The display device of claim 1, further comprising an impact absorbing member interposed between the liquid crystal panel and the first support section to absorb impact and vibration.

3. The display device of claim 2, wherein the impact absorbing member includes at least one of acryl resin, polyurethane resin, rubber resin, a tape, black pigment, black dye and black material.

4. The display device of claim 2, wherein the impact absorbing member is disposed on the second and fourth frames.

5. The display device of claim 1, wherein the first frame faces the third frame and the second frame faces the fourth frame.

6. The display device of claim 1, wherein the second and fourth frames have a height lower than the height of the second support section.

7. The display device of claim 1, wherein the second and fourth frames have a height of 0.4 mm to 0.8 mm.

* * * * *